(12) United States Patent
Francis (10) Patent No.: US 6,883,505 B1
(45) Date of Patent: Apr. 26, 2005

(54) ROCKER BOX ASSEMBLY WITH REED VALVE

(75) Inventor: Kenneth A. Francis, St. Louis, MO (US)

(73) Assignee: Midwest Motorcycle Supply, Arnold, MO (US)

( * ) Notice: Subject to any disclaimer, the term of this patent is extended or adjusted under 35 U.S.C. 154(b) by 0 days.

(21) Appl. No.: 10/817,488

(22) Filed: Apr. 2, 2004

(51) Int. Cl.⁷ ................................................. F02B 25/06
(52) U.S. Cl. ...................................................... 123/572
(58) Field of Search ................................ 123/434, 572, 123/573, 574

(56) References Cited

U.S. PATENT DOCUMENTS

| | | | |
|---|---|---|---|
| 2,982,273 A | 5/1961 | Bergmann |
| 3,270,727 A | 9/1966 | Nance |
| 3,712,278 A | 1/1973 | Kuhn |
| 3,949,724 A | 4/1976 | Nickly |
| 4,169,432 A | 10/1979 | White |
| 4,327,678 A | 5/1982 | Pollet |
| 4,438,734 A | 3/1984 | Hayashi |
| 4,459,966 A | 7/1984 | Sakano et al. |
| 4,538,561 A | 9/1985 | Amemori et al. |
| 4,538,734 A | 9/1985 | Gill |
| 4,549,520 A | 10/1985 | Tamba et al. |
| 4,597,372 A | 7/1986 | Furukawa |
| 4,602,595 A | 7/1986 | Aoki et al. |
| 4,602,607 A | 7/1986 | Balsley |
| 4,686,945 A | 8/1987 | Inagaki et al. |
| 4,686,946 A | 8/1987 | Umeda et al. |
| 4,711,224 A | 12/1987 | Eckhardt |
| 4,721,075 A | 1/1988 | Kasai |
| 4,721,090 A | 1/1988 | Kato |
| 4,730,579 A | 3/1988 | Yamada et al. |
| 4,881,496 A | 11/1989 | Kronich |
| 4,911,120 A | 3/1990 | Sumi |
| 4,916,704 A | 4/1990 | Bruckert et al. |
| 4,920,930 A | 5/1990 | Sakano et al. |
| 4,920,943 A | 5/1990 | Castellari |
| 4,926,814 A | 5/1990 | Bonde |
| 4,969,434 A | 11/1990 | Nakagawa |
| 4,995,352 A | 2/1991 | Machino |
| 5,027,784 A | 7/1991 | Osawa et al. |
| 5,058,542 A | 10/1991 | Grayson et al. |
| 5,067,449 A | 11/1991 | Bonde |
| 5,205,243 A | 4/1993 | Buchholz |
| 5,233,967 A | 8/1993 | Peller |
| 5,309,878 A | * 5/1994 | Kandler et al. ......... 123/196 M |

(Continued)

FOREIGN PATENT DOCUMENTS

| | | |
|---|---|---|
| DE | 4326332 A1 | 2/1995 |
| EP | 0580350 A1 | 1/1994 |
| EP | 0691619 A2 | 1/1996 |
| EP | 0693836 A1 | 1/1996 |
| EP | 0695997 A2 | 2/1996 |
| EP | 0738058 A2 | 10/1996 |
| EP | 0752786 A1 | 1/1997 |
| EP | 0766184 A2 | 4/1997 |
| EP | 0782296 A2 | 7/1997 |
| EP | 0792044 A2 | 8/1997 |
| GB | 2167810 A | 6/1986 |

*Primary Examiner*—Bibhu Mohanty
(74) *Attorney, Agent, or Firm*—Thompson Coburn LLP (57) ABSTRACT

A rocker box bottom for an internal combustion engine includes a body that defines an oil/air inlet, an oil outlet, a chamber therebetween and a valve seat between the chamber and the oil/air inlet. The body seals to a rocker box top and defines the inlet and outlets. The seat may accept a valve along a diagonally downward direction with the oil outlet below the seat. In the alternative, the path between the oil/air inlet and the air outlet may turn the air flowing therethrough approximately 180 degrees. In another preferred embodiment, the valve may be a reed valve that, in cooperation with the chamber walls, turns the oil/air mixture flowing therethrough approximately 180 degrees.

18 Claims, 4 Drawing Sheets

U.S. PATENT DOCUMENTS

| | | |
|---|---|---|
| 5,421,292 A | 6/1995 | Hoffman et al. |
| 5,474,035 A | 12/1995 | Ming et al. |
| 5,487,371 A | 1/1996 | Beckman et al. |
| 5,647,337 A | 7/1997 | Johnson et al. |
| 5,706,769 A | 1/1998 | Shimizu |
| 6,047,670 A | 4/2000 | Stella et al. |
| 6,065,457 A | 5/2000 | Hoffmann et al. |
| 6,161,529 A | 12/2000 | Burgess |
| 6,263,847 B1 | 7/2001 | Hoffmann et al. |
| 6,296,071 B1 | 10/2001 | Runte et al. |
| 6,345,613 B1 | 2/2002 | Hoffmann et al. |

* cited by examiner

ROCKER BOX ASSEMBLY WITH REED VALVE

FIELD OF THE INVENTION

This invention relates generally to rocker box assemblies for internal combustion engines.

BACKGROUND OF THE INVENTION

The moving components of a motorcycle engine require lubrication to preserve and extend their useful lives. Many of the moving components are located in the crankcase and rocker box of the engine. In operation, the oil used for lubricating the components in the crankcase (i.e. the connecting rod, crankshaft, and associated links) is atomized and sprayed thereon. As a result, a fine oil mist exists in the air in the crankcase. Some vaporized oil also exists within the crankcase because of the heat conducted from the combustion chamber. The air in the crankcase therefore holds a noticeable amount of atomized and vaporized oil.

The oil mixed in the air represents a problem because the crankcase must be vented for proper operation. If the crankcase were not vented, the trapped air would fluctuate in pressure as the pistons reciprocate. Since it is the pressure difference between the combustion chamber and the crankcase that drives the pistons down during the power stroke, the pressure of the trapped gas would oppose the power stroke and decrease the performance of the engine proportionally.

Venting the crankcase, though, creates other difficulties. Namely, as the piston moves toward the crankcase during the power stroke, the air being vented entrains the atomized and vaporized oil. If the oil is not separated from the air before being vented, the engine eventually runs dry and fails for lack of lubrication. For this reason, engine manufacturers typically include an oil/air separator, an air cleaner, or both in the crankcase vent subsystem. These devices minimize the amount of oil vented from the crankcase with the air. But they are not perfect.

Currently available oil/air separators and air cleaners tend to allow some oil to escape from the crankcase with the air. Once outside of the engine, the oil fouls the motorcycle and the rider thereon. The oil/air separators and cleaners of the prior art also add to the weight of the engine and tend to decrease the acceleration and handling characteristics of the bike according to the extra weight. Further, because a motorcycle engine must be small enough to fit within the frame of the motorcycle and to allow the rider to straddle the same, even small increases in the size of the engine are detrimental. Yet currently available oil/air separators and air cleaners increase the overall size of the engine.

A need therefore exists for improved oil/air separators.

SUMMARY OF THE INVENTION

It is in view of the above problems that the present invention was developed. The invention includes apparatus and methods for separating oil from the air being vented from motorcycle engines.

In a first preferred embodiment, the present invention provides a rocker box bottom for an internal combustion engine. The bottom has a surface that seals to a rocker box top and that lies in a first plane. The body defines an oil/air inlet, an air outlet, an oil outlet, a chamber therebetweeen, and a valve seat. The oil/air inlet accepts a mixture of oil and air from the crankcase of an internal combustion engine. The valve seat may accept a valve that lies in a second plane (at an acute angle relative to the first plane) between the oil/air inlet and the chamber. The oil outlet is located below the seat when the rocker box bottom is in an upright orientation.

A second preferred embodiment provides a rocker box bottom in which the path between the oil/air inlet and the air outlet turns the air through approximately 180 degrees. In still another preferred embodiment, the valve is a reed valve that, in cooperation with the walls of the chamber, turns the air through approximately 180 degrees around the valve. In yet other preferred embodiments, an air restrictor may be inserted in the airflow path near the air outlet. In other preferred embodiments, both the valve and valve seat are metallic. Metallic reed valves and seats enjoy improved performance and lengthened service lives over existing rubber components because the rubber becomes hard after repeated heat cycles.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention, and together with the description, serve to explain the principles of the invention. In the drawings.

DETAILED DESCRIPTION OF THE PREFERRED EMBODIMENTS

Figure 1:
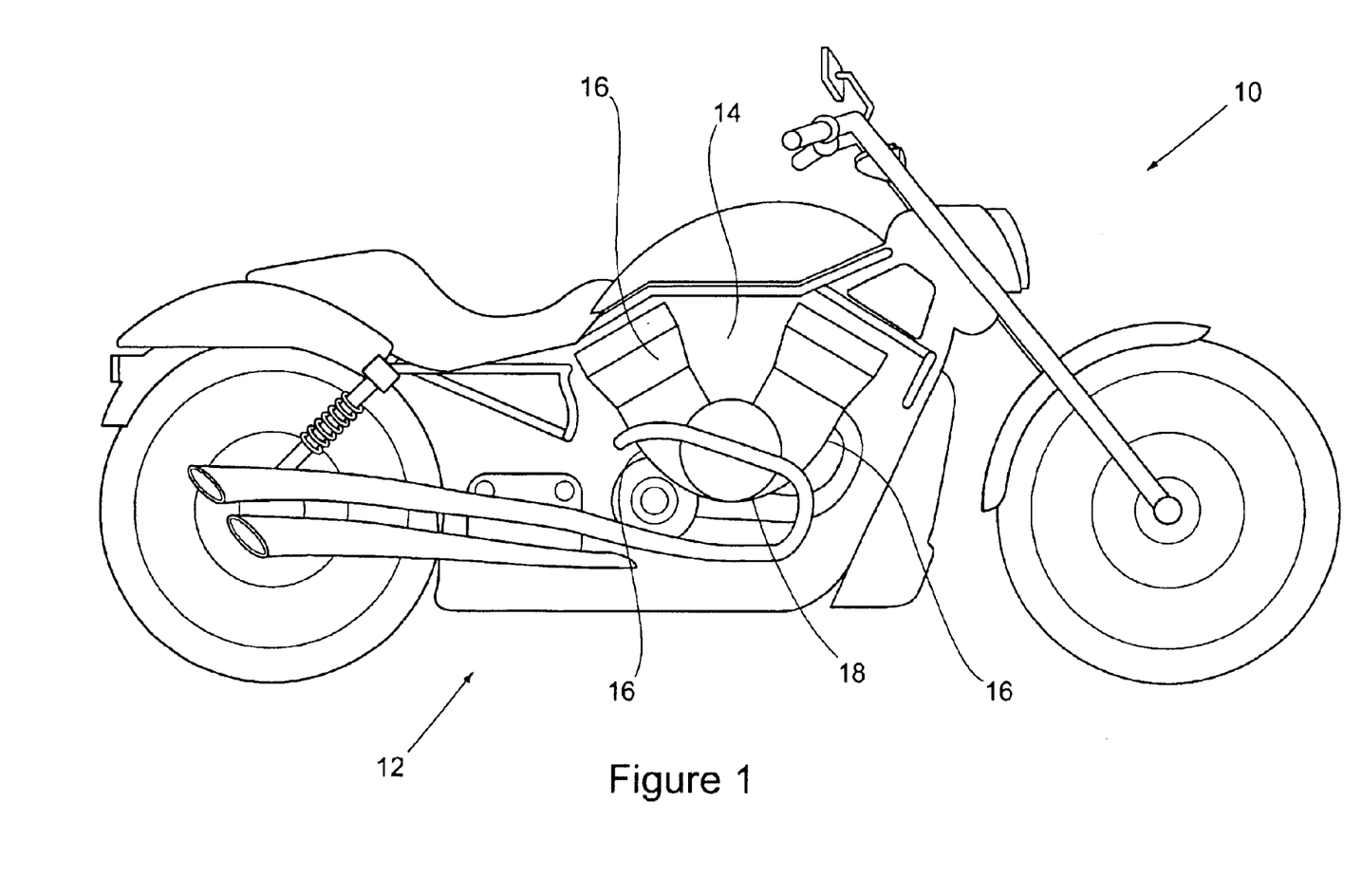
FIG. 1 illustrates a motorcycle engine constructed in accordance with a preferred embodiment of the present invention.

Referring to the accompanying drawings in which like reference numbers indicate like elements, FIG. 1 illustrates a motorcycle constructed in accordance with a preferred embodiment of the present invention. The motorcycle 10 includes a frame 12 on which the various components of the motorcycle are mounted. An internal combustion engine 14 is mounted near the bottom of the frame 12 in a position where the rider straddles it during operation. The engine 14 includes cylinder blocks 16 with pairs of pistons canted at an angle from each other. Beneath the cylinder blocks 16, a crankcase 18 receives the reciprocal motion of the pistons and converts it to rotational motion for propelling the motorcycle 10.

Figure 2:
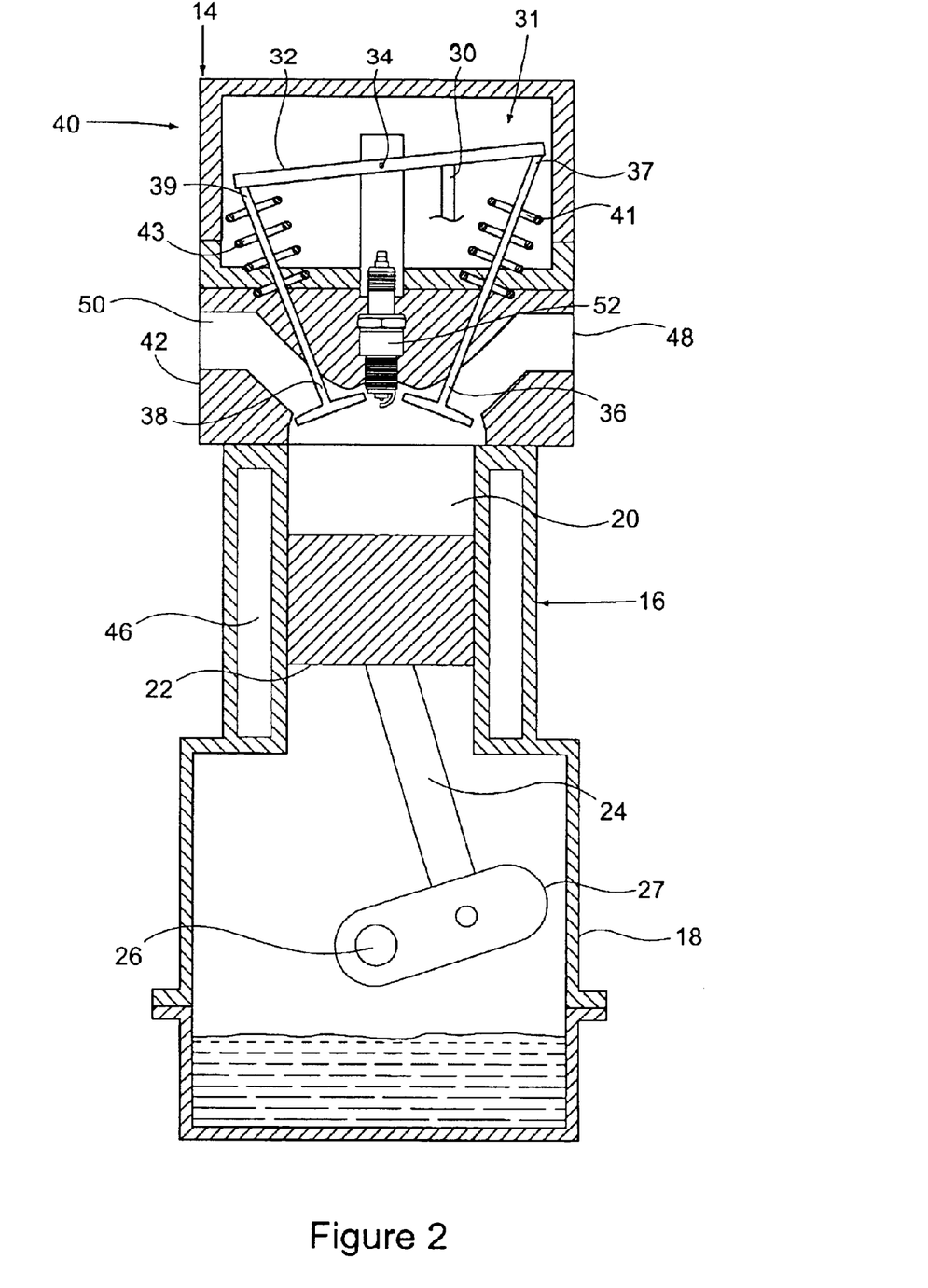
FIG. 2 illustrates a cross sectional view of a motorcycle engine.

With reference now to FIG. 2, a simplified cross sectional view of the engine 14 is shown. The engine 14 includes the cylinder block 16, the crankcase 18, combustion chambers 20, pistons 22, connecting rods 24, a crankshaft 26, and links 27. Near the top of the engine 14, FIG. 2 also illustrates a push rod 30, a rocker arm assembly 31, a rocker arm 32, a shaft 34, a pair of valves 36 and 38, a rocker box 40 and a cylinder head 42. Also shown are coolant channels 46, manifolds 48 and 50, and a spark plug 52.

In general, the engine 14 is constructed as follows. The cylinder head 42 contains many features of the engine 14 and is coupled to the top of the cylinder block 16. First, the overall dimensions of the cylinder block 16 are determined primarily by performance requirements for the engine 14. More particularly, the required stroke of the piston 22 largely determines the height of the cylinder block 16 and, therefore, of the engine 14. The cylinder head must also accommodate, or guide, many moving components, such as the push rod 30, that extends between the crankcase 18 and the rocker box 40. Additionally, the cylinder block 16 includes passages within which the valves 36 and 38 move to control the entry and discharge of fluids (e.g. the air/fuel mixture and the exhaust gas) from the combustion chamber 20. Therefore, the cylinder head 42 also includes lubrication channels (not shown) to provide oil for the moving components within its envelope. Like the valves 36 and 38, the spark plug 52 extends into the combustion chamber 20 from the cylinder head 42. The cylinder head 42, as shown in FIG. 2, seals the valves 36 and 38 along with the spark plug 52 to prevent the escape of gases from the chamber 20. Because the cylinder head 42 is in direct contact with the hot combustion gases, it must be designed to tolerate high temperatures and pressures. Thus, the cylinder head 42 also includes coolant channels (not shown) to maintain its temperature within a tolerable range during operation. The head 42 also defines the fuel/air and exhaust manifolds 48 and 50 respectively. Thus, the cylinder head 42 is relatively complex and requires expensive machining to fabricate.

With continued reference to FIG. 2, the rocker box 40 is also illustrated. It couples to the top of the cylinder head 42 and is therefore spaced apart from the hot gases in the combustion chamber 20. Accordingly, the environment experienced by the rocker box 40 is comparatively mild. Within the rocker box 40, the rocker assembly 31 is found. One end of the push rod 30 extends from the crankcase 18 (where a cam drives it) into the rocker box 40. Therein the push rod 30 connects to the rocker arm 32 and causes it to pivot around the shaft 34. Typically, one of the valves 36 or 38 connects to a particular rocker arm 32. Though FIG. 2 shows the rocker arm 32 connected to both valves 36 and 38 for illustrative purposes. Because the height of the cylinder block 16 largely determines the height of the engine, the height of the rocker box is preferably minimized. Otherwise, the rocker box 40 is of relatively simple construction.

The crankcase 18 contains the connecting rods 24, the crankshaft 26, and the links 27 and is shown with a reservoir of oil. The crank case 18 is coupled to the bottom of the cylinder block 16, includes the coolant channels 46, and allows the piston 22 to reciprocate within a cylinder defined by the cylinder block 16. The connecting rod 24 couples the reciprocating piston 22 to the crankshaft 26 via a link 27. Within the cylinder block 16, and located above the piston 22, the combustion chamber 20 is defined by the walls of the cylinder block 16, the top of the piston 22, and the cylinder head 42.

In operation, fuel and air enter the combustion chamber 20 via the manifold 48 and valve 36. The spark plug 52 ignites the fuel/air mixture and therefore causes the hot combustion gases to push the piston 22 down. Once the piston reaches the bottom of the cylinder, the exhaust valve 38 opens and allows the returning piston 22 to push the exhaust gases from the combustion chamber 20. While the piston 22 is reciprocating in the cylinder it is turning crankshaft 26 via the connecting rod 24 and link 27. For the valves 36 and 38 to actuate in timed relation with the reciprocating piston 22, a cam driven by the crankshaft 26 is provided that causes the push rod 30 to reciprocate. In turn, the push rod 30 causes the rocker arm 32 to pivot about the shaft 34 thereby actuating the valves 36 and 38.

Because of the relative motion of the moving components in the rocker box 40, lubrication is required. The moving components include, but are not limited to, the push rod 30, the rocker arm 32, the shaft 34, and the valves 36 and 38. For convenience, the moving components 30, 32, 34, 36, and 38 will hereinafter be referred to as the rocker assembly 31.

Figure 3:
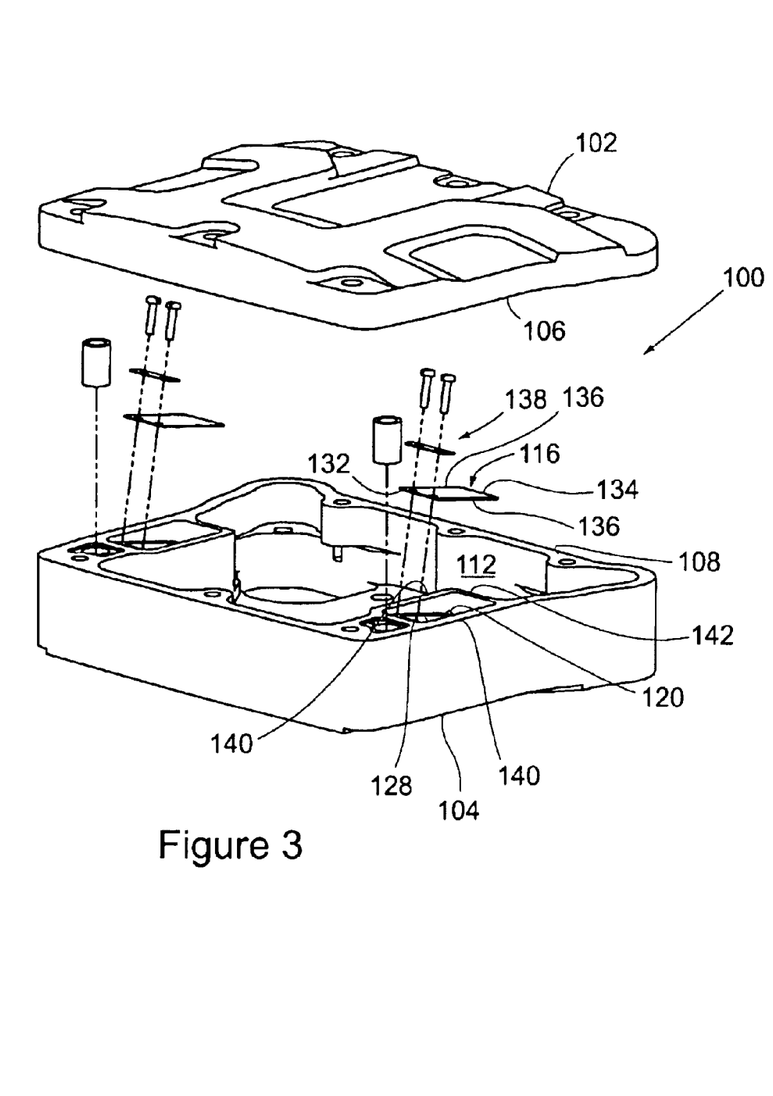
FIG. 3 illustrates an exploded view of a rocker box of FIG. 2.
Figure 4:
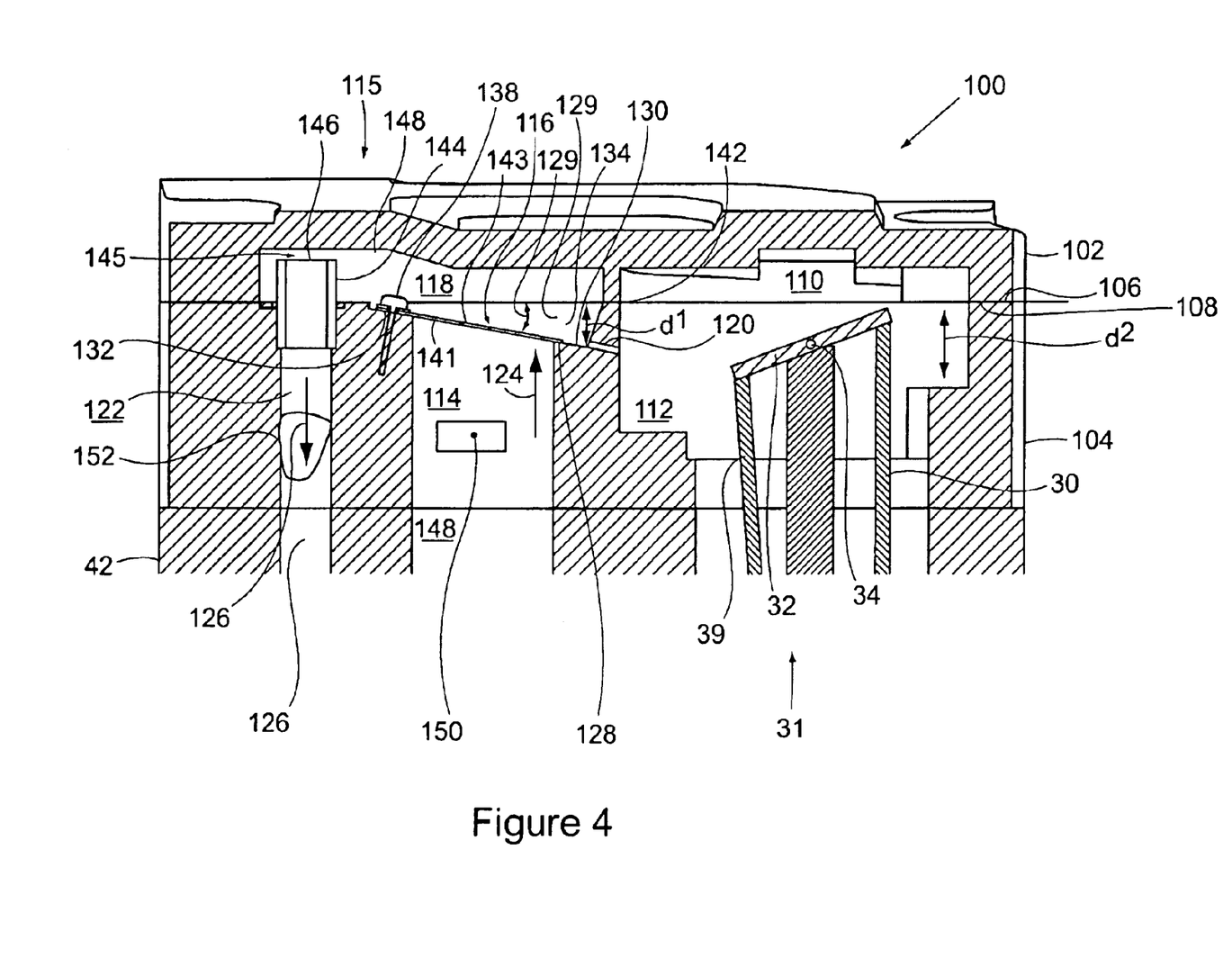
FIG. 4 illustrates a cross sectional view of the rocker box of FIG. 2.

With reference now to FIGS. 3 and 4, a rocker box 100 constructed in accordance with a preferred embodiment of the present invention is illustrated. The functions that the rocker box 100 serves include protecting the rocker assembly 31 from mechanical abuse, providing a source of lubrication for the rocker assembly 31, and providing means for separating the oil/air mixture vented from the crankcase 18. Preferentially, the separation of the oil from the air permits the oil to lubricate the rocker assembly 31.

To serve these functions, the rocker box 100 includes several components and defines a number of chambers, voids, or cavities. First, the rocker box 100 includes a top 102 and bottom 104, although, rocker boxes of generally one-piece construction are also within the spirit and scope of the present invention. The top 102 and bottom 104 are illustrated as sealing along a plane at a pair of surfaces 106 and 108 respectively. While the sealing surfaces 106 and 108 are illustrated as planar, they may be of any conventional configuration. A pair of cooperating cavities 10 and 112 in the top 102 and bottom 104, respectively, provide space for the rocker assembly 31.

As shown in cross section by FIG. 4, the bottom 104 includes an, oil/air separator 115. The separator 115 includes an inlet plenum 114, a valve 116, a condensation chamber 118, an oil outlet 120, and an air outlet plenum 122. In general these components are arranged and configured so as to cause pressure changes as the oil/air mixture flows through the oil separator 115. As a result of these pressure changes the oil in the air tends to, condense. Various techniques may be used to create the condensation inducing pressure changes, such as restricting the flow of the mixture and creating large changes in the direction of the flow. Preferentially, the direction changes turn the air through about 180 degrees or more.

While the engine 14 is running, the oil/air mixture vented from the crankcase 18 enters the inlet plenum 114. Preferentially, the mixture is generally flowing in a direction indicated by the arrow 124. From the inlet plenum 114, the mixture flows to the valve 116 and into the condensation chamber 118. Therein, the oil condenses and drains to the oil outlet 120 as will be explained in more detail herein. From there, the oil outlet 120 may direct the oil to the chambers 110 and 112 to lubricate the rocker assembly 31. In the meantime, the air continues flowing from the condensation chamber 118 to air outlet plenum 122 and may be further directed to an air cleaner thereafter. As shown by FIG. 4, the direction 126 of the air flow through the outlet plenum 122 is preferably 180 degrees from the direction 124 of the flow through the inlet plenum 114.

In another preferred embodiment shown in FIG. 4, a rocker box 100 is provided in which the valve 116 is angled down (as viewed in FIG. 4) relative to the sealing plane to aid in the separation of the oil from the air. More particularly, the bottom 104 is shown as including a valve seat 128 positioned at an acute angle 129 with respect to the plane along which the sealing surfaces 106 and 108 meet. The valve seat 128 is preferably coplanar with angled surface 130. Herein, "down" refers to a direction generally parallel to the length of the cylinder block 16 and from the rocker box 40 to the crankcase 18.

Thus, as the oil/air mixture flows through the restriction associated with the angled valve 116, the associated pressure drop causes oil to condense from the mixture. Further, because of the angle 129, the condensed oil flows along the seat 128 and continues across surface 130 toward the oil outlet 120. The angle 129, of course, would ordinarily cause an increase in the overall height of the engine by a distance d1. However, in a preferred embodiment, the vertical distance d1 between the outlet 120 and a proximal end 132 of the valve 116 is about equal to, or less, than the height d2 of the rocker assembly 31. Additionally, the seat 128 and surface 130 are shown positioned relative to the rocker assembly 31 such that they reside within the height d2 required for the rocker assembly 31. As a result, the present embodiment provides the angle 129 and accompanying improvement in oil/air separation without necessitating an increase in the overall height of the engine.

The oil outlet 120 is preferentially placed near the lowest point of the surface 130. Additionally, it is preferred to provide an oil outlet 120 with a bore diameter that is about the diameter required to draw the oil into the outlet 120 by capillary action. Further, the rocker box 100 may be configured such that the oil outlet 120 points toward the rear of the motorcycle so that when the rider accelerates, oil flows through the outlet 120 because of the acceleration of the motorcycle. Such outlets 120 collect oil from the condensation chamber 118 even with the motorcycle 10 inclined in such a manner as to discourage oil drainage, as in a sharp turn. Moreover, the pressure in the condensation chamber 118 urges the oil in the oil outlet 120 toward the chambers 110 and 112. While a preferred oil outlet 120 is circular in cross section, outlets 120 of various configurations are also provided with effective hydraulic diameters sufficient to wick the condensed oil into the outlet 120.

In yet another preferred embodiment the valve 116 may be a reed valve. Reed valves typically include a body with the proximal end 132, a distal end 134, and a pair of side edges 136 (see FIGS. 3 and 5). FIG. 4 shows the reed valve 116 as being affixed to the bottom 104 with conventional attachment means 138. The body of the valve 116 is typically flexible enough to elastically deform when subjected to pressure from the seat side 141 of the body so as to open the valve 116. In contrast, pressure from the downstream side 143 (facing the chamber 118) tends to urge the valve 116 against the seat 128, thereby closing the valve 116. Thus, the reed valve 116 may also serve as a check valve to prevent admittance of contaminants when the crankcase draws in air while also allowing venting of the oil/air mixture from the crankcase.

A closer inspection of the reed valve 116 reveals further advantages of the present embodiment. As the oil/air mixture flows from the inlet 114, the mixture tends to impinge upon the seat side 141 of the valve 116. Oil mist will therefore collect thereon and drain, or be urged by the flow of the mixture, toward the oil outlet 120. A portion of the mixture also reaches a stagnation point, or low velocity area, adjacent the seat side 141 before turning to flow laterally (and distally) across the seat side 141 of the valve 116. The pressure changes associated with the low velocity area also cause the oil mist and fumes to condense thereabout.

As the mixture flows from the stagnation region, the mixture changes direction by approximately 90 degrees (either by flowing around the side edges 136 or the distal end 134). After making its way around the body, the mixture then changes direction again (by approximately 90 degrees in the opposite direction). Thus, the body causes another condensation inducing 180 degree turn of the mixture. Meanwhile the mixture flowing around the edges 136 converges over the downstream side 143 of the valve 116 thereby creating an area of condensation inducing impingement of one stream against the other.

Figure 5:
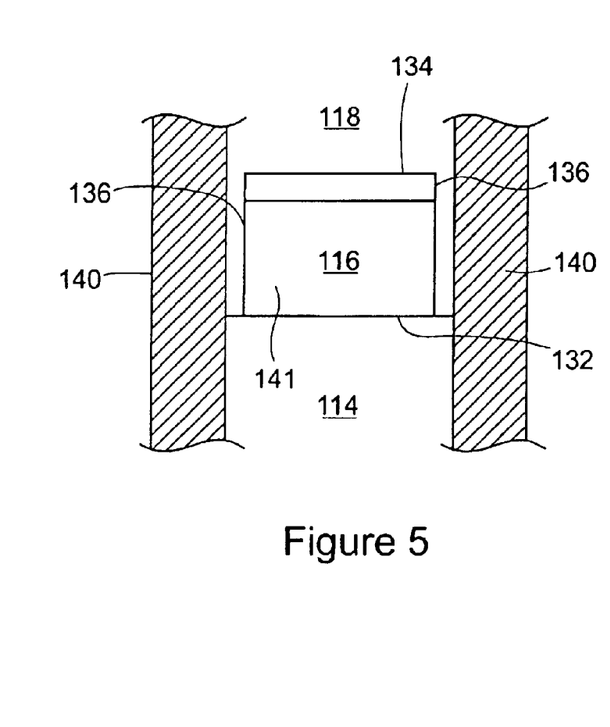
FIG. 5 illustrates a side elevation view of a valve of the rocker box of FIG. 2.

In still another preferred embodiment shown by FIG. 5, the flow around the valve 116 is channeled to further enhance oil separation. A pair of sidewalls 140 is shown partially enclosing the valve 116 adjacent to the side edges 136. An end wall 142 (see FIGS. 3 and 4) further encloses the valve 116 adjacent the distal end 134. Thus, when the valve 116 opens, air flows preferentially around the distal end 134. Little, if any, air flows around the side edges 136 because the clearance between the side edges 136 and sidewalls 140 is preferentially limited to an amount sufficient to avoid friction between the valve 116 and the walls 140. In contrast, the distance between the distal end 134 and the end wall 142 is preselected such that the combination of the distal end 134 and end wall 142 restricts the flow as it rounds the distal end 134. Thus, yet another condensation inducing pressure change is created in the flow by this restriction. Moreover, because the oil outlet 120 is positioned below, or adjacent to, the distal end 134, oil condensing in this manner tends to drain immediately to the oil outlet 120.

Referring to FIG. 4 again, yet another preferred embodiment of the present invention is shown. In the current embodiment, a flow restrictor 144 is placed in the outlet plenum 122. In particular, if the air outlet 122 presents a circular cross section to the airflow, the restrictor 144 is a cylindrical tube. It is understood, however, that other cross-sectional shapes could be used without departing from the scope of the invention. An orifice may also be included in the restrictor 144 to further restrict the flow. Furthermore, the restrictor 144 may have a length sized to create a restriction 145 in the flow between a proximal end 146 of the restrictor 144 and a bottom surface 148 of the top 102 adjacent the proximal end 146. As the mixture flows from the condensation chamber 118, a pressure drop develops across the restriction 145 and additional oil condensation occurs in the area of the restriction 145. From there it drains to the oil outlet 120.

With continuing reference to FIG. 4, another preferred embodiment is shown for use wherein the oil/air channel 148 of the cylinder block 16 is not aligned with the mixture inlet plenum 114. According to a preferred embodiment, a channel 150 is provided in the rocker box bottom 104 to port the incoming mixture to the inlet plenum 114. Likewise, a channel 152 is provided to port the air separated from the oil/air mixture to an air cleaner. Nonetheless, the directions of flow 124 and 126 in the inlet and outlet plenums remain approximately 180 degrees from each other.

In view of the foregoing, it will be seen that the several advantages of the invention are achieved and attained. First, a motorcycle oil/air separator with enhanced separation capabilities has been provided. Separators are also provided that maintain the envelope of pre-existing low-profile motorcycle engines. Notably, the height of the engine may be maintained while providing the enhanced oil separation of the present invention.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A rocker box bottom for an internal combustion engine, the bottom comprising:
   a body having a surface that is adapted to seal to a rocker box top, at least a part of the surface lying in a first plane, the body defining:
      an oil/air inlet adapted to accept a mixture of oil and air from a crankcase of the internal combustion engine;
      a chamber in fluid communication with the oil/air inlet;
      a valve seat adapted to accept a valve between the oil/air inlet and the chamber, the valve seat lying in a second plane, the second plane being oriented relative to the first plane to define an acute angle therebetween;
      an air outlet in fluid communication with the chamber; and
      an oil outlet in fluid communication with the chamber, the oil outlet being located below the seat when the rocker box bottom is in an upright orientation, the oil outlet being adapted to receive oil from the chamber as the oil condenses from the mixture, the air outlet being adapted to receive air of the mixture as the air exits the chamber.

2. The rocker box bottom according to claim 1, wherein the oil/air inlet is oriented to accept the mixture flowing generally in a first direction from the crankcase, and the air outlet is oriented to carry air exiting the chamber in a second direction, the second direction being approximately 180 degrees from the first direction, whereby the 180 degree turn of the air causes a pressure rise in the chamber.

3. The rocker box bottom according to claim 1, further comprising:
   the valve to be a reed valve, the reed valve having a proximal end that is connected to the body adjacent the valve seat and a distal end that is moveable relative to the body between open and closed positions, the reed valve including a pair of side edges extending between the proximal and distal ends;
   the body including walls adjacent the side edges of the reed valve, the reed valve and the walls together being configured to direct the flow of the mixture generally in a first direction as the mixture exits the oil/air inlet through the valve, the chamber being shaped and configured to redirect the flow of the mixture exiting the oil/air inlet through the valve in a second direction generally toward the air outlet, the second direction being approximately 180 degrees from the first direction, whereby the 180 degree turn of the air causes a pressure drop around the turn.

4. The rocker box bottom according to claim 1, wherein the air outlet is adapted to accept an air flow restrictor to restrict the air flow, whereby the restriction causes a pressure rise in the chamber.

5. The rocker box bottom according to claim 4, wherein the air outlet has a circular cross-section.

6. The rocker box bottom according to claim 1, wherein the valve seat is metallic.

7. A rocker box bottom for an internal combustion engine, the bottom comprising:
   a body having a surface adapted to seal to a rocker box top, the body defining
   an oil/air inlet adapted to accept a mixture of oil and air from a crankcase of the internal combustion engine, the oil/air inlet being oriented to accept the mixture flowing generally in a first direction from the crankcase;
   a chamber in fluid communication with the oil/air inlet;
   a valve seat adapted to accept a valve between the oil/air inlet and the chamber,
   an oil outlet in fluid communication with the chamber, the oil outlet being located below the seat when the rocker box bottom is in an upright orientation, the oil outlet being adapted to receive oil from the chamber as the oil condenses from the mixture; and
   an air outlet in fluid communication with the chamber, the air outlet being oriented to carry air exiting the chamber in a second direction, the second direction being approximately 180 degrees from the first direction, whereby the 180 degree turn of the air causes a pressure rise in the chamber.

8. The rocker box bottom according to claim 7, wherein at least a part of the surface lies in a first plane, the valve seat lying in a second plane, the second plane being oriented relative to the first plane to define an acute angle therebetween.

9. The rocker box bottom according to claim 7, further comprising:
   a reed valve, the reed valve having a proximal end that is connected to the body and a distal end that is moveable relative to the body between open and closed positions, the reed valve including a pair of side edges extending between the proximal and distal ends;
   the body including walls adjacent the side edges of the reed valve, the reed valve and the walls together being configured to direct the flow of the mixture generally in a first direction as the mixture exits the oil/air inlet through the valve, the chamber being shaped and configured to redirect the flow of the mixture exiting the oil/air inlet th rough the valve in a second direction generally toward the air outlet, the second direction being approximately 180 degrees from the first direction, whereby the 180 degree turn of the air causes a pressure drop around the turn.

10. The rocker box bottom according to claim 7, wherein the air outlet is adapted to accept an air flow restrictor to restrict the air flow, whereby the restriction causes a pressure rise in the chamber.

11. The rocker box bottom according to claim 10, wherein the air outlet has a circular cross-section.

12. The rocker box bottom according to claim 7, wherein the valve seat is metallic.

13. A rocker box bottom for an internal combustion engine, the bottom comprising:
   a body having a surface that is adapted to seal to a rocker box top, the body defining an oil/air inlet adapted to accept a mixture of oil and air from a crankcase of the internal combustion engine, a chamber in fluid communication with the oil/air inlet, an air outlet in fluid communication with the chamber and adapted to receive air of the mixture as the air exits the chamber, and an oil outlet in fluid communication with the chamber, the oil outlet being located below the seat when the rocker box bottom is in an upright orientation, the oil outlet being adapted to receive oil from the chamber as the oil condenses from the mixture; and a reed valve between the oil/air inlet and the chamber, the reed valve having a proximal end that is connected to the body and a distal end that is moveable relative to the body between open and closed positions, the reed valve including a pair of side edges extending between the proximal and distal ends;

the body including walls adjacent the side edges of the reed valve, the reed valve and the walls together being configured to direct the flow of the mixture generally in a first direction as the mixture exits the oil/air inlet through the valve, the chamber being shaped and configured to redirect the flow of the mixture exiting the oil/air inlet through the valve in a second direction generally toward the air outlet, the second direction being approximately 180 degrees from the first direction, whereby the 180 degree turn of the air causes a pressure drop around the turn.

14. The rocker box bottom according to claim 13 wherein at least a part of the surface lies in a first plane, the valve lying generally in a second plane when it is in a substantially closed position, the second plane being oriented relative to the first plane to define an acute angle therebetween.

15. The rocker box bottom according to claim 13, wherein the oil/air inlet is oriented to accept the mixture flowing generally in a first direction from the crankcase, the air outlet being oriented to carry air exiting the chamber in a second direction, the second direction being approximately 180 degrees from the first direction, whereby the 180 degree turn of the air causes a pressure rise in the chamber.

16. The rocker box bottom according to claim 13, wherein the air outlet is adapted to accept an air flow restrictor to restrict the air flow, whereby the restriction causes a pressure rise in the chamber.

17. The rocker box bottom according to claim 16, wherein the air outlet has a circular cross-section.

18. The rocker box bottom according to claim 13, wherein the reed valve is metallic.

\* \* \* \* \*